Patented Oct. 10, 1939

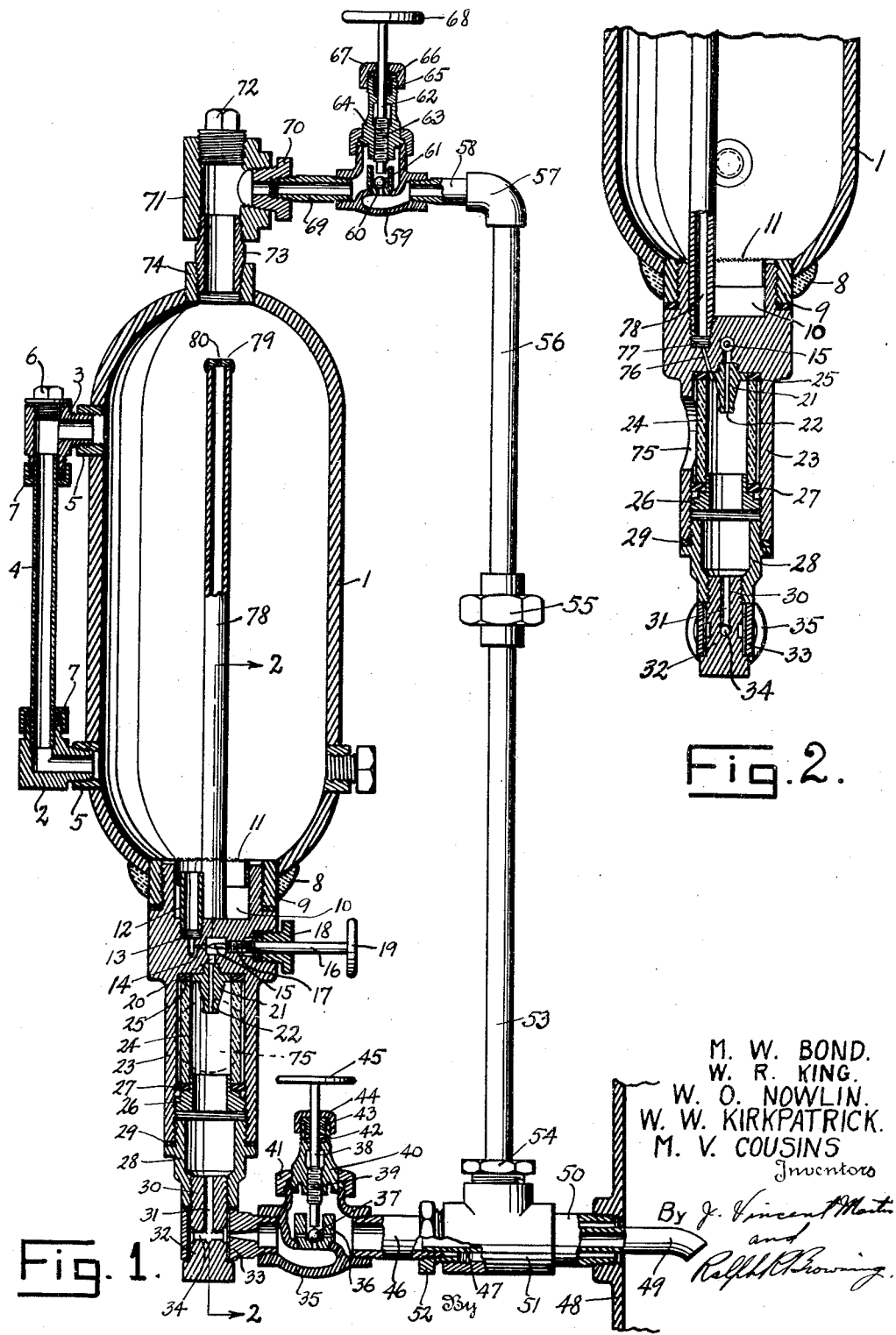

2,175,455

UNITED STATES PATENT OFFICE 2,175,455

COMPRESSOR LUBRICATOR

Milton V. Cousins, Merle W. Bond, Warren W. Kirkpatrick, and William O. Nowlin, Bethany, La., and William R. King, Mineola, Tex.

Application September 13, 1937, Serial No. 163,514

1 Claim. (Cl. 184—56)

This invention relates to an apparatus for introducing a lubricating fluid into the cylinders of compressors for natural gas or the like.

In lubricating the cylinders of compressors used in pumping natural gas and the like, it has been found that gasoline and other products which divide out of the gas will dilute and render ineffective for lubrication the customary mineral oils. It has therefore become necessary to employ a soap lubricant or some similar product for this purpose. It is also desirable to regulate the flow of such lubricant as desired and to be able to observe the flow of lubricant for this purpose.

It is an object of this invention to provide a mechanism for introducing into the cylinder or cylinders of a compressor of natural gas or the like some lubricating substance such as a soap lubricant.

It is a more specific object to provide a mechanism which will introduce such lubricant at some predetermined rate such as may be desired.

Another object of this invention is to provide such a structure with a means whereby the lubricant being fed into the cylinder may be observed at all times so that the rate of feed may be easily regulated.

It is a further object of this invention to provide an apparatus of the type set forth in which the means for viewing the rate of feed will be kept clear of bubbles or the like.

It is another object of this invention to provide such an apparatus which will be automatic in its operation and will require a minimum of attention to keep it functioning properly.

One other object of this invention is to provide such an apparatus with valves which normally act in the capacity of check valves to prevent reverse flow of the lubricant or gas but which may be positively closed to shut off the apparatus from communication with the cylinder in either direction.

Other objects and advantages of this invention will become apparent from the following description taken in connection with the accompanying drawing, it being distinctly understood, however, that said description and drawing are by way of illustration and example only and are not to be taken as in any way a limitation upon the spirit or scope of this invention. This invention is to be limited in scope only by the prior art and by the terms of the appended claim.

In the drawing:

Fig. 1 is a vertical cross-section illustrating an apparatus constructed in accordance with this invention and showing its connection with the suction line to a compressor cylinder.

Fig. 2 is a similar view illustrating the lower part of the apparatus shown in Fig. 1 and taken along the line 2—2 of Fig. 1.

The numeral 1 in the drawing indicates the body of the lubricator within which the lubricant is retained. This serves as a reservoir of the lubricant supply.

Connected to one side of the body 1, there are shown a pair of vertically spaced fittings comprising the elbow 2 and the T-fitting 3. Between these two fittings and having its lower end disposed within the upturned open end of the fitting 2 and its upper end disposed within the down turned opening in the fitting 3, is a gauge glass 4. The fittings 2 and 3 are threadedly connected to nipples 5, fixedly mounted on the body 1 and communicating with the interior thereof. The upper opening of the T-fitting 3 is closed by means of a plug 6, or the like, and the ends of the gauge glass 4 are sealed within the openings in the fittings 2 and 3 by means of packings compressed with packing nuts 7.

At its lower end, the body 1 is provided with an opening into which is secured by means of welding 8, or the like, a threaded collar 9. Threaded into this collar 9 is a special fitting having an upwardly opening chamber 10 at its upper end in communication with the interior of the body 1 and being provided with a screen, or the like, 11 across the open end of such opening. A short length of tubing 12 is threaded into an opening 13 in the bottom of the chamber 10, and this opening 13 leads to a small duct terminating in a needle valve seat 14. The tubing, with the chamber 10, forms a sediment trap so that any sediment in the lubricant may settle into chamber 10 and not be forced into the needle valve seat. Cooperating with the needle valve seat 14 is a needle valve 15 carried on the inner end of a valve stem 16 threaded into the special fitting as indicated at 17. The stem 16 is sealed to the fitting by means of a packing compressed by a gland nut 18 and has a hand wheel 19 on its outer end so that it may be rotated to vary the amount of liquid permitted to pass therethrough.

Leading from the needle valve 15 is another opening 20 through which the lubricant after passing the needle valve 15 will flow. Threaded into this opening 20 is a nozzle 21 having an opening 22 therethrough, the lubricant after passing the needle valve 15 being adapted to pass downwardly through this nozzle and drop or flow to the cylinder as will be presently described.

The nozzle 21 is located within a lower chamber 23 of the special fitting and within this chamber is a transparent cylindrical member 24 sealed at its upper end to the fitting about the nozzle by means of a packing 25 and held in place within the fitting by means of a nut 26. A packing 27 serves to seal the joint between the nut 26 and the transparent member 24.

An outlet fitting 28 is threaded into the lower end of the chamber 23 below the nut 26 and is sealed to the lower end of this chamber by means of a packing 29. At its lower end it is provided with an internal threaded opening adapted to receive a fitting known as a union bolt designated by the numeral 30. This fitting has a downwardly extending passageway 31 therein and a reduced intermediate portion 32 adapted to receive the union fitting 33. A transverse passageway 34 at the lower end of the passageway 31 communicates with the passageway through the union fitting 33. Secured to the outer end of the union fitting 33 is a special valve 35 having a valve seat element 36 adapted to seat a ball valve 37. A stem 38 threaded at 39 into a cover 40 on this valve is adapted when moved downwardly to bear against the ball valve 37 and lock the same into a sitting position, thus positively closing this valve and transforming it from a check valve into a valve which prevents flow in either direction. The cover member 40 is secured in place by means of a nut 41 and has stuffing box at its upper end adapted to receive a packing 42. This packing is in turn compressed by means of a gland 43 held in place by a gland nut 44. The stem 38 is provided with a hand wheel 45 so that it may be closed or opened at will.

Secured to an outlet of the valve 35 is a nipple 46 internally threaded at its outlet end to receive a spout element 47. This element passes through an opening in the wall of the suction line 48 of a compressor cylinder and has a spout 49 formed on the end thereof within the suction line.

The spout element 47 passes freely through the opening in the suction line, but a nipple 50 of larger diameter than the spout element is secured within the opening in the suction line and sealed thereto. This nipple is likewise threaded into one arm of a T-fitting 51, and the other arm of which is joined to the nipple 46 by means of a threaded bushing 52.

A length of tubing 53 is connected to the leg of the T-fitting 51 by means of a bushing 54, and at its opposite end is connected with a union 55 to a second length of tubing 56. The opposite end of the length of tubing 56 is provided with an elbow 57 carrying a nipple 58 to a valve 59. The valve 59 is quite similar to the valve 35, differing therefrom principally in size. It is provided with a seat element 60 which seats a ball valve 61. A stem 62 threadedly connected at 63 to a cover member 64 may be rotated to move the same downwardly and positively close the ball valve 61 in much the same manner as that previously described. The upper end of the cover member 64 is formed with a stuffing box adapted to receive a packing 65, which packing is compressed about the stem 62 by means of a gland 66 and a packing nut 67. A hand wheel 68 provides a means for rotating the stem 62 to positively seat or release the valve 61.

Leading from the outlet end of the valve 59 is a nipple 69 connected by means of a bushing 70 to the leg of the T-fitting 71. A plug 72 serves to close one arm of this T-fitting, and upon removal provides a filler opening, and a nipple 73 serves to connect the other arm thereof to an internally threaded sleeve 74 fixedly mounted upon the upper end of the body 1 and in communication with the interior thereof.

In order that an observer might be able to see the flow from the nozzle 21 and thus be able to properly regulate this flow, opposed openings 75 are provided in one side of the chamber 23 at points opposite the transparent tube 24. However, it has been found that with a soap or similar lubricants bubbles will form therein to such an extent that the flow cannot be observed through the openings 75. In order to overcome this difficulty a small passage 76 is provided leading from the upper into the lower portion of the special fitting and by-passing the needle valve 15 and nozzle 21. The upper end of this passageway 76 terminates in a threaded socket 77 adapted to receive an upstanding section of tubing 78. To the upper end of this section 78 is secured a closure element 79 having a very small opening 80 therethrough.

In operation, this device depends for its functioning upon the fluctuation of the pressures in the line to the compressor cylinder. When the ball valves 37 and 61 are open and thus free to act as check valves, an increase in the pressure within the cylinder 48 cannot pass through the ball valve 37 into the body 1 but is permitted to pass through the nipple 50 and the tubing 53 and 56 and the ball valve 61. Inasmuch as this ball valve is positioned in a manner the reverse of that of the valve 37, the pressure from the intake line may pass through the valve 61 and from thence flow into the upper end of the body 1.

The upper end of the tube 78 is adapted to be at all times higher than the highest level of the lubricant within the body 1. When the pressure in the suction line falls, the pressure existing above this lubricant acts upon the surface thereof and tends to force it downwardly past the needle valve 15 and out through the nozzle 21, from whence it passes through the valve 37 and nozzle 49 into the suction line to the cylinder. While this is going on, however, the gas pressure existing above the lubricant will force gas through the opening 80 in the closure at the upper end of the tube 78. This gas will pass downwardly through the tube 78 and the passageway 76 from whence it will enter the chamber within the transparent tube 24. As this gas enters this chamber it tends to break up any bubbles which may form in the chamber and to keep the transparent walls of the chamber clear so that an observer may see the fluid flowing therethrough. An observer may then watch the fluid as it leaves the nozzle 21 and by regulating the needle valve 15 control very closely the amount of lubricant entering the cylinder.

Tube 78 and orifice 80 also act in an equalizing capacity. In previous practice pressures above and below the valve 14 have been equalized so that only the hydraulic head of the liquid in the chamber feeds the lubricant. In this device the equalization is partly accomplished by the tube 78, but due to the throttling effect of the orifice 80 the pressure is always slightly higher in the chamber 1.

From the foregoing it will be seen that a means has been provided for carrying out all of the objects and advantages sought by this invention in a thoroughly practical and simple manner.

Having described our invention, we claim:

In a lubricator, a lubricant reservoir, a conduit leading from said reservoir to the point of application of the lubricant, said conduit having a transparent section therein whereby flow therethrough may be observed, means for introducing a gas pressure into the upper portion of said reservoir to cause the flow of said lubricant through said reservoir and a second means for injecting a small portion of said gas pressure from the upper end of said reservoir into the transparent section of said conduit to keep said transparent section clear and permit visibility of the flow therethrough said second means not being used to cause the flow of lubricant through said transparent section.

MILTON V. COUSINS.
  WARREN W. KIRKPATRICK.
  WILLIAM O. NOWLIN.
  MERLE W. BOND.
  WILLIAM R. KING.